United States Patent

Chana

[11] 4,111,073
[45] Sep. 5, 1978

[54] PROGRESSIVELY VARIABLE TRANSMISSION

[75] Inventor: Howard E. Chana, Troy, Mich.

[73] Assignee: General Motors Corporation, Detroit, Mich.

[21] Appl. No.: 759,800

[22] Filed: Jan. 17, 1977

[51] Int. Cl.² .............................................. B60K 41/18
[52] U.S. Cl. ...................................... 74/865; 74/859; 74/861; 74/863
[58] Field of Search ................. 74/861, 863, 864, 865, 74/786

[56] References Cited

U.S. PATENT DOCUMENTS

| | | | |
|---|---|---|---|
| 2,588,952 | 3/1952 | Baisch | 74/786 |
| 2,804,748 | 9/1957 | Hutchinson | 74/786 |
| 3,548,682 | 12/1970 | Schofield et al. | 74/865 |

Primary Examiner—Benjamin W. Wyche
Assistant Examiner—Wesley S. Ratliff, Jr.
Attorney, Agent, or Firm—A. M. Heiter

[57] ABSTRACT

A power train having a single shaft gas turbine engine having high idle speed and higher maximum torque speed and a progressively variable ratio transmission matched and controlled to provide increasing speed ratio and decreasing torque ratio relative to increasing engine torque and output speed for an accelerating drive at constant maximum tractive effort for a maximum performance vehicle starting and accelerating drive in a low output speed range up to maximum engine power and then increasing speed ratio and decreasing torque ratio for higher speed drives with reduced torque. The transmission has a hydromechanical unit having an engine driven planetary gear providing a variable speed ratio constant torque ratio drive to the input of a friction drive toric unit and a hydrostatic transmission with a constant displacement pump motor driven by the planetary gear reaction member and a variable displacement motor connected in one arrangement to drive the input and in another arrangement to drive the output which is connected by a forward reverse gear unit to drive the vehicle. The hydrostatic transmission differential pressure and motor displacement are controlled in response to engine speed and throttle position to reduce reaction member speed from the free rotary speed to zero speed to increase speed ratio from zero to a maximum and decrease torque ratio from a maximum to a minimum. The pump brake and toric unit are both controlled by speed and power requirements to provide high torque ratio at high input speed for constant maximum torque in a low output speed starting range up to maximum engine power. Then the pump brake holds the reaction member stationary to provide its highest speed ratio, and the toric unit speed ratio is increased for higher speed drives.

23 Claims, 6 Drawing Figures

PROGRESSIVELY VARIABLE TRANSMISSION

SUMMARY OF THE INVENTION

This invention relates to power trains having a variable ratio transmission and particularly to positive drive progressively variable ratio transmissions.

The invention provides an improved power train having the engine, transmission, and vehicle matched and controlled to provide smooth progressive ratio change for maximum vehicle tractive effort in low vehicle speed range and full engine power tractive effort at higher vehicle speeds for maximum performance and lower tractive effort for lower performance. The transmission has a large range of speed ratios, output speed over input speed, and torque ratios, output torque over input torque. In a low vehicle speed range, the transmission is controlled to provide zero speed ratio at zero vehicle speed and to progressively increase the speed ratio and to provide a torque ratio related to engine torque to provide constant torque drive for maximum vehicle tractive effort for maximum performance. A transmission matched with a gas turbine engine, particularly of the single shaft type, which provides minimum torque at idle speed and progressively increasing torque with increasing speed in an idle to maximum engine operating speed range at high speeds is controlled to provide a torque ratio progressively decreasing as the engine torque increases to provide substantially constant output torque for acceleration in a low vehicle speed range.

The transmission is particularly suitable for providing improved progressively variable high torque multiplication when maximum power engine torque is low for a high performance low vehicle speed drive.

The transmission has a hydromechanical unit having a planetary reduction gear and a hydrostatic transmission. The planetary gear has an engine driven input member and a controlled progressively variable speed reaction member providing an increasing speed ratio and constant torque ratio mechanical drive to the input of a progressively variable friction drive unit providing progressively inversely variable speed ratio and torque ratio drive to the output in a mean range. In the referred arrangement there is an input sun gear, an output carrier driving the friction drive unit, and a reaction ring gear. The reaction member is connectd to a hydrostatic pump brake controlled by a load control system to control the speed of the reaction member, permitting free rotation for zero speed ratio or stall and progressively reducing ring gear speed to zero to progressively increase the planetary unit speed ratio to its maximum and to provide a reaction varying with engine torque for torque multiplication at a constant torque ratio. The load control system for the pump brake has a controlled outlet pressure regulator and a variable displacement control. The outlet pressure regulator controls the pump brake pressure delivered to the motor in porportion torque demand or throttle position and vehicle speed to limit the pressure and torque capacity, and thus torque multiplication, at values increasing with torque demand. The pump brake is fluid connected to a motor driving a portion of the friction drive unit to provide a variable displacement hydrostatic transmission drive connecting the reaction member to a portion of the friction drive unit. The hydrostatic motor has variable displacement controls to provide a hydrostatic transmission providing progressively variable speed and torque ratio controls. The hydrostatic transmission provides the required reaction force proportional to engine torque and controls the speed of the reaction member. During rotation of the reaction member, reaction torque drives the pump and delivers hydraulic torque and power to the motor to drive the power train at the toric unit input in a simple axial unit, or at the toric unit output to reduce the load on the toric unit.

The controls, in the low vehicle speed range for accelerating the vehicle, the range where the engine, especially a turbine engine, is accelerated to maximum power, operate in response to speed and torque demand such as throttle position, to provide an overall speed ratio of zero at zero output speed and to increase the overall speed ratio with increasing speed and an overall torque ratio decreasing relative to increasing engine torque to provide a constant drive with increasing output speed and increasing engine speed.

In the arrangement with the hydrostatic motor driving the friction drive unit input, the hydrostatic transmission is controlled to decrease the torque hydraulically transmitted and to increase the reaction with increasing engine torque and thus increase the torque transmitted mechanically by the constant torque ratio gearset to provide an increasing mechanical torque to the friction drive unit. The sum of the hydraulic and mechanical torque delivered to the friction drive unit input is near constant. The friction drive unit in the low speed range provides a constant torque multiplication to provide a constant high output torque with increasing speed. The gear unit provides a speed reducing ratio increasing from zero at zero speed to a higher value, and the friction drive unit provides a constant speed reducing ratio in the low speed range up to the vehicle speed providing maximum delivered power.

In the arrangement with the hydrostatic motor driving the friction drive unit output, the hydrostatic transmission is controlled to decrease the torque transmitted hydraulically to the output shaft with increasing speed and to increase the reaction on the planetary gear unit to provide a reaction equal to the increasing net engine torque which is multiplied by the constant gear unit torque ratio and an increasing friction drive unit torque ratio to provide an increasing torque output to the output shaft which, when added to the decreasing hydraulic torque, provides a near constant total torque in the low speed range for vehicle acceleration.

These and other features of the invention will be more apparant from the following description and accompanying drawings of the preferred embodiments, wherein.

Figure 4:
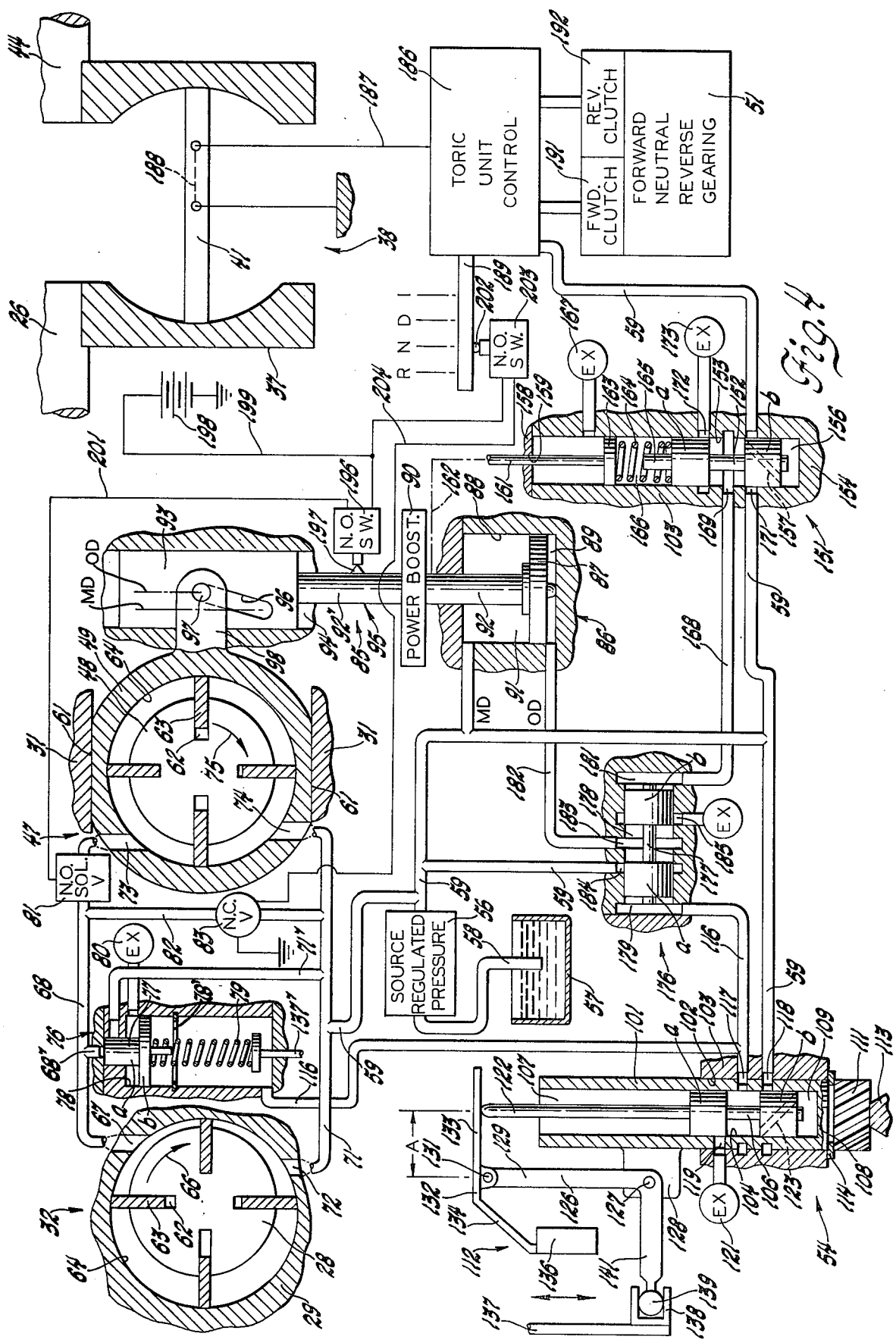
Figure 5:
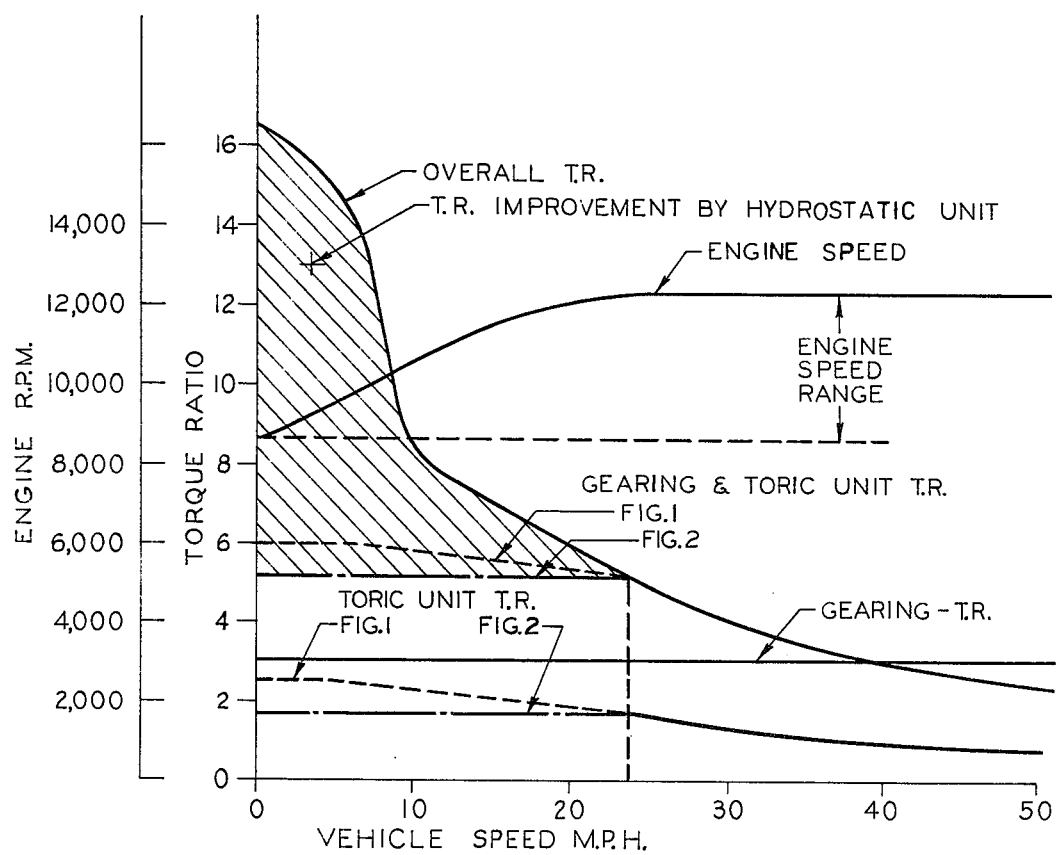
Figure 6:
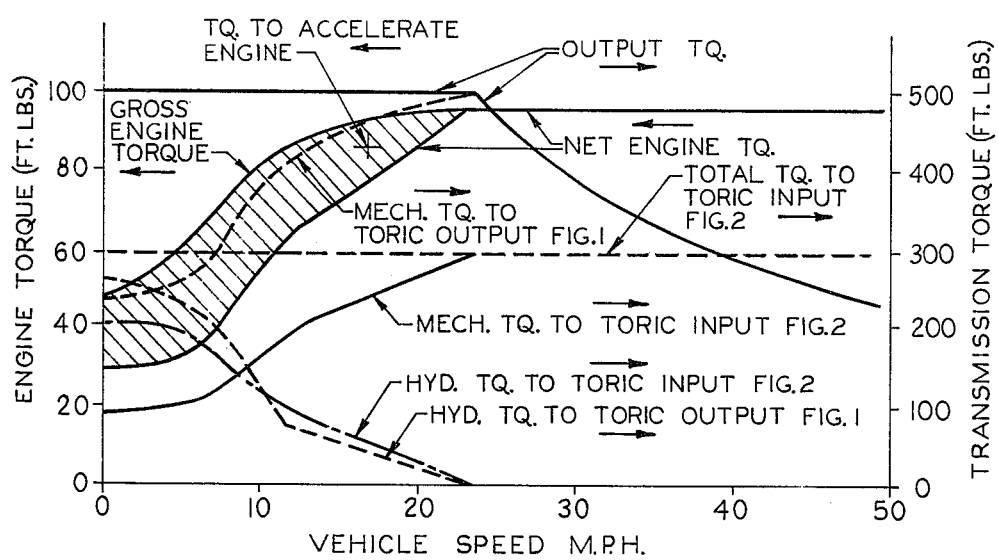

FIG 4 schematically shows a control system for the transmission;

FIG. 5 is a plot of engine speed and torque ratio relative to vehicle speed; and FIG. 6 is a plot of engine torque and transmission torque relative to vehicle speed.

Figure 1:
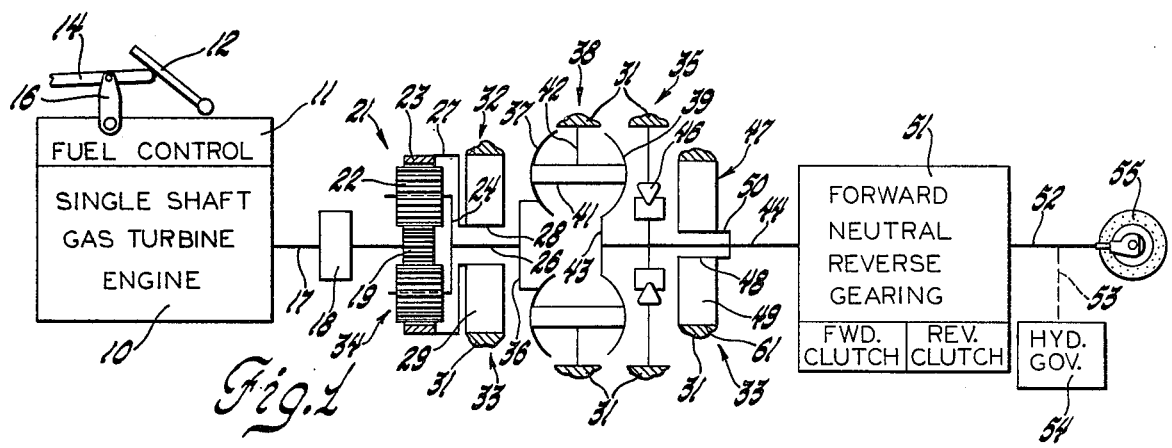
FIG. 1 shows a power train having a single shaft gas turbine engine and a progressively variable ratio transmission having gear, hydrostatic and friction transmission components in a series parallel drive relation.

The power train shown in FIG. 1 has a single shaft gas turbine engine 10 having a fuel control mechanism 11 controlled by a throttle 12, connected by a throttle rod 14 to a throttle lever 16, all of conventional construction, to control the power delivered by the engine to the transmission input shaft 17. The input shaft 17 drives vehicle accessories, such as the transmission pump 18. The pump is art of source 56 (FIG. 4), of regulated fluid pressure for the control system and for charging hydrostatic transmission 33. Input shaft 17 also drives sun gear 19 of input planetary gear unit 21. The input planetary gear unit has planet pinions 22 meshing with ring gear 23 and with sun gear 19 and rotatably mounted on carrier 24 connected to drive intermediate or toric input shaft 26. The ring gear 23 is connected by drive member 27, having a drum and disc portion, to rotor 28 of hydrostatic pump brake 32 which also has a stator 29 fixed in housing 31. Hydrostatic pump brake 32 is connected by delivery line 68 and suction line 71 to motor 47 to form the hydrostatic transmission 33 having controls as shown in FIG. 4 and described below.

The input planetary gear unit 21 and the hydrostatic transmission unit 33 form a hydromechanical transmission unit 34. Hydromechanical transmission unit 34 and toric transmission unit 38 form the ratio change transmission unit 35 connected between input shaft 17 and ratio change output shaft 44.

The intermediate shaft 26 is connected by a hub element 36 to drive the input torus 37 of the toric traction unit of progressively variable ratio friction drive transmission 38. The conventional friction drive transmission 38 has the input torus 37 and output torus 39 connected by a plurality of friction discs 41 mounted for rotation and relative tilting cntrol movement on support member 42 mounted on housing 31. Conventional toric friction transmission units are known as shown, for example in U.S. Pat. No. 3,581,587 Frank Dickenbrock, granted June 1, 1971. The outut torus 39 has an output hub 43 connected to drive ratio output shaft 44. A one-way brake 46 is connected between ratio output shaft 44 and housing 31 to prevent reverse rotation of the ratio output shaft 44, since many friction transmissions require a single direction of rotary drive for proper operation. The hydrostatic motor 47 of hydrostatic transmission 33 has a rotor 48 connected by drive member 50 to drive ratio output shaft 44 and a stator 49 which is nonrotatably mounted for limited transverse sliding variable capacity or displacement control movement on guide ways 61 on housing 31, as described below in connection with the controls. The ratio output shaft 44 provides only a forward drive and is connected by the conventional forward, neutral, and reverse manually controlled gear unit 51 to the final output 52. The final output shaft 52 drives a governor dirve 53 and governor 54 and the load, the vehicle drive axle and wheels 55.

MODIFICATION

Figure 2:
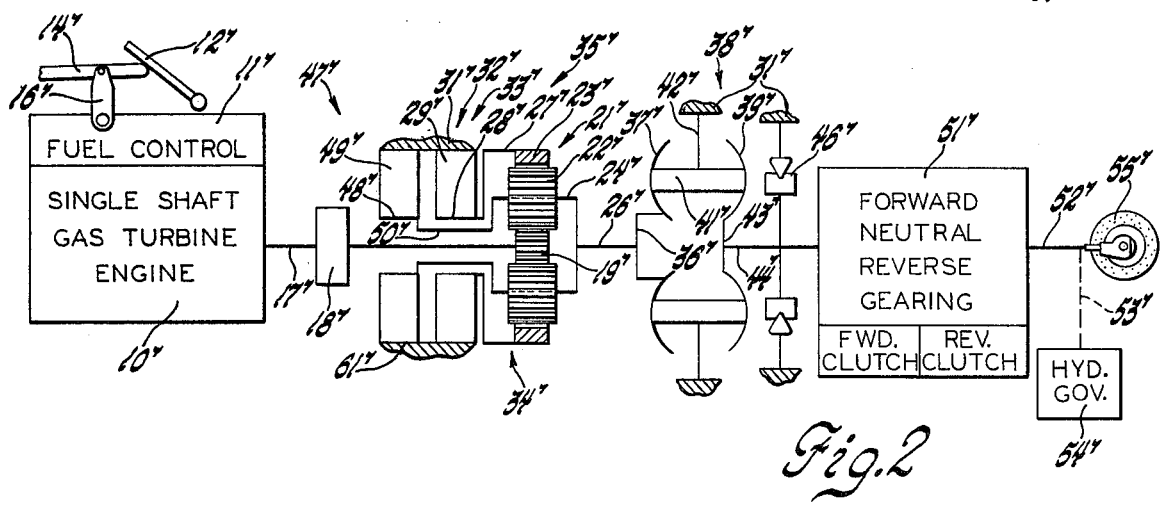
FIG. 2 shows a power train having a single shaft gas turbine engine and a progressively variable ratio transmission having gear, hydrostatic and friction transmission components in series drive relation.

The modified power train shown in FIG. 2 has the same components as the FIG. 1 power train, so like reference numerals, primed, have been used and reference is made ot the above description of FIG. 1 for the common components and features. However, in FIG. 2, the components are arranged so that the hydrostatic transmission 33' and the friction transmission 38' are in series drive arrangement as described below, rather than the parallel drive arrangement of the FIG. 1 power train.

The engine 10' drives transmission input shaft 17' which drives source pump 18' and input sun gear 19' of planetary gear unit 21'. The planetary gear unit planetary pinions 22' mesh with sun gear 19' and ring gear 23' and are mounted for rotation on carrier 24' which is drive connected to intermediate shaft 26'. The ring gear 23' is connected by a similar drive member 27' to rotor 28' which cooperates with stator 29' fixed to housing 31' forming the hydrostatic pump 32' of hydrostatic transmission unit 33'. The hydrostatic motor 47' in this modification is located forward of the hydrostatic pump or nearer the engine and closely adjacent or in contact with the pump so the respective connecting delivery and suction lines 68' and 71' are short. The motor 47' has a stator 49' nonrotatably mounted for sliding variable displacement movement on housing 31', and a rotor 48' cooperating therewith and connected by drive member 50' to carrier 24' to contribute hydrostatic drive to the planetary gear drive to intermediate shaft 26'. The intermediate shaft 26' provides the input through hub element 36' to input torus 37' of friction drive transmission or toric unit 38'. The output torus 39' is driven by the friction discs 41' rotatably and tiltably mounted on support member or mast 42' mounted on housing 31'. The output torus 39' is connected by hub member 43' to ratio output shaft 44'. A one-way brake 46' is connected between ratio output shaft 44' and housing 31' to prevent rotation of shaft 44', which, as pointed out above, is a desirable feature for many traction devices. The planetary gear unit 21', hydrostatic unit 33', and toric unit 38' form the ratio change unit 35' between input shaft 17' and ratio output shaft 44'. The ratio output shaft 44' is connected by forward, neutral, and reverse gearing 51' to final output shaft 52' which is connected by governor dirve 53' to drive governor 54' and drives a load, a vehicle driven by conventional differential axle and drive wheels 55'.

POWER DRIVE CONTROLS

The control system for both the FIG. 1 and FIG. 2 power trains is shown in FIG. 4 and described with reference to FIG. 1 with unprimed reference numerals, but also applies to FIG. 2, with the same numerals, primed. The structural and calibrational differences are specifically pointed out below. The source of regulated fluid pressure 56 for the hydrostatic transmission and the control system for both the hydrostatic transmission and the friction transmission may be provided by a conventional pump 18 and regulator valve [not shown] which receives fluid from the sump 57 and suction line 58 and delivers regulated fluid pressure to the mainline 59 with overage for lubrication. The hydrostatic transmission 33 has a pump brake 32 and a motor 47. The pump brake 32 is of the fixed displacement type, with the rotor 28 mounted with fixed eccentricity relative to the stator 29 which is fixed to housing 31. The motor 47 has a motor 48 mounted for rotation to drive the output hub 50 and mounted within the stator 49 which is nonrotatably mounted for transverse adjustable movement on the parallel flat guideways 61 on the external surface of stator 49 and an internal surface of housing 31 in order to move the stator transversely relative to the fixed axis of rotation of the stator to vary the displacement of motor 47. The pump 32 and motor 47 are shown as being vane-type hydrostatic machines in which rotors 28 and 48 have a plurality of radial slots 62 receiving vanes 63 for reciprocal sliding movement, and have springs [not shown] to continuously bias the vanes 63 into engagement with inner cylindrical surface 64 of the stator 49. Other types of hydrostatic machines may be used. When rotor 28 of pump 32 is driven in the direction indicated by arrow 66, by the reaction drive of ring gear 23 of the input planetary gear unit 21, fluid is delivered to pressure port 67 and power pressure delivery line 68 and received from suction line 71 and suction 72 to circulate fluid in hydrostatic transmission 33 to provide a reaction force on ring gear 23 and to deliver torque from pump brake 32 to motor 47 controlled by the motor displacement control system.

When fluid under pressure is delivered by the pressure line 68 to motor 47 at pressure or inlet port 73, and exhausted by exhaust or outlet port 74, to the suction line 71 and the motor has some positive displacement above zero displacement, the motor is driven in the direction of arrow 75. The mainline 59 supplies fluid pressure to suction line 71 to charge the hydrostatic transmission system at minimum charging pressure.

The power delivery pressure line 68 is connected by bypass line 68' to relief valve 76, having a valve element 77 with small land $a$ and large land $b$ in a stepped bore 78 which similarly has small and large diameter portions and is closed by a closure at both ends. A throttle linkage poriton 137' has a small diameter rod portion extending in sliding sealing relation through an aperture in the closure for the large bore portion and a spring seat in the large bore portion for spring 79 which engages land 77$b$ and biases valve element 77 to the closed position shown. The throttle linkage portion 137', with increasing throttle, moves to compress spring 79 and increase valve closing torque demand bias force. The governor line 116 is connected to the large portion of bore 78, which is a closed chamber, and acts on land 77$b$ to bias valve element 77 to closed position with a valve closing output speed bias force. Exhaust 80 vents bore 78 at the step between the large and small bore portions. Power delivery pressure line 68 is connected by bypass line 68' to the closed end of small portion of bore 78 to act on land 77$a$ to provide a valve opening bias force. During normal drive operation at all vehicle speed, the torque demand bias force provided by the throttle linkage portion 137' and the output speed bias force hold bypass relief valve 76 closed as shown so the transmission transmits rated drive torque. During overrun drive, normally at idle throttle, the governor pressure bias force holds the relief valve 76 closed so the transmission transmits proper overrun torque for rated engine braking torque. During normal drive operation if drive torque and the hydrostatic differential power pressure (the pressure difference between the pressure in delivery line 68 less the charging pressure in return line 71), significantly exceeds the required pressure which increases with increasing throttle up to a maximum (e.g. 5,000 psi), at full throttle, the relief valve 76 opens and connects delivery line 68 via bypass delivery line 68' to bypass return line 71' to return line 71. During overrun, a conventional one-way relief valve may be used to relieve high pressure exceeding the rated value in return line 71 to line 58 having low pressure.

A normally open solenoid valve or shut-off valve 81 is placed in pressure delivery line 68 and controlled to shut off pressure flow from pump 32 to motor 47 when the motor is in the zero displacement position [OD]. Exhaust line 82 extends from pressure line 68 to suction line 71, bypassing solenoid valve 81 and motor 47, and has a normally closed solenoid neutral dump valve 83 to exhaust pressure line 68 to suction line 71 when the manual control 189 is in neutral.

The displacement of motor 47 is controlled by a servo motor 86 which has a piston 87 mounted for reciprocation between a zero displacement position [OD] and maximum displacement position [MD] in a cylinder 88 closed at both ends to provide a displacement increasing chamber 89 and a displacement decreasing chamber 91 on opposite sides of the piston 87. The displacement decreasing chamber 91 is on the same side of piston 87 as piston rod 92 and thus has less area, and the same pressure provides a lower force. Piston rod 92 is attached to piston 87 and connected to power booster 90 which actuates piston rod 92' connected to crosshead 93 mounted for reciprocal movement in guideways 94. The conventional power booster 90 multiplies the low control force provided by balancing-type ratio control servo motor 86 in rod 92 to provide in rod 92' a sufficiently high force to actuate the displacement change control, to prevent displacement change control reaction forces acting on rod 92 and piston 87 to move rods 92 and 92' together or proportionately, and may be constructed as shown on Page 3-36, FIG. 3.31, of "Control Engineers' Handbook", John G. Truxal (McGraw-Hill Book Co., Inc., 1958), and operated by mainline pressure or hydrostatic power delivery pressure from power delivery line 68 functioning as the supply passage.

The crosshead 93 has a calibrated variable sloped cam slot 96 calibrated to vary motor displacement as a variable function of governor pressure. As explained below under "Operation", with reference to the operation TABLES, a different variable function or cam slope is required for the FIG. 1 and the FIG. 2 power trains. The cam slot 96 cooperates with a pin 97 which projects into slot 96 and is secured to control arm 98 on motor stator 49 to reciprocate the motor stator in guideways 61 to vary displacement.

The governor 54 has a rotatable valve sleeve 101 rotatably mounted in bore 102 of valve body 103. The sleeve 101 has inner bore 104 to receive valve element 106 having equal diameter lands $a$ and $b$. The sleeve 101 has an open end 107 beyond land $a$ and an end wall 108 closing the end of inner bore 104 beyond land $b$ providing a chamber 109 between end wall 108 and land $b$. A drive gear 111, driven by governor drive mechanism 53, is secured to end wall 108 of rotatable sleeve 101 to rotate the sleeve 101 and governor weight mechanism 112. Suitable means, such as the valve body 103 portion 113 engaging the free end of gear 111 and the snap ring 114 which fits in a groove in sleeve and gear assembly 101, 111, and engages the body portion 113, prevents axial movement of gear 111, rotatable sleeve 101, and weight mechanism 112. Governor pressure line 116 is always connected by governor port 117 to inner bore 104 between the lands 106$a$ and $b$, and is supplied with mainline pressure fluid by mainline 59 and port 118 and is exhausted by exhaust port 119 to exhaust 121. The weight mechanism 112 acts on stem portion 122 of valve element 106 to bias the valve element in a governor pressure increasing direction, and the governor pressure in the space between lands 106$a$ and $b$ is connected through land $b$ by passage 123 to chamber 109 to provide a governor pressure force reducing governor pressure to regulate governor pressure in accordance with the force provided by weight mechanism 112.

Figure 3:
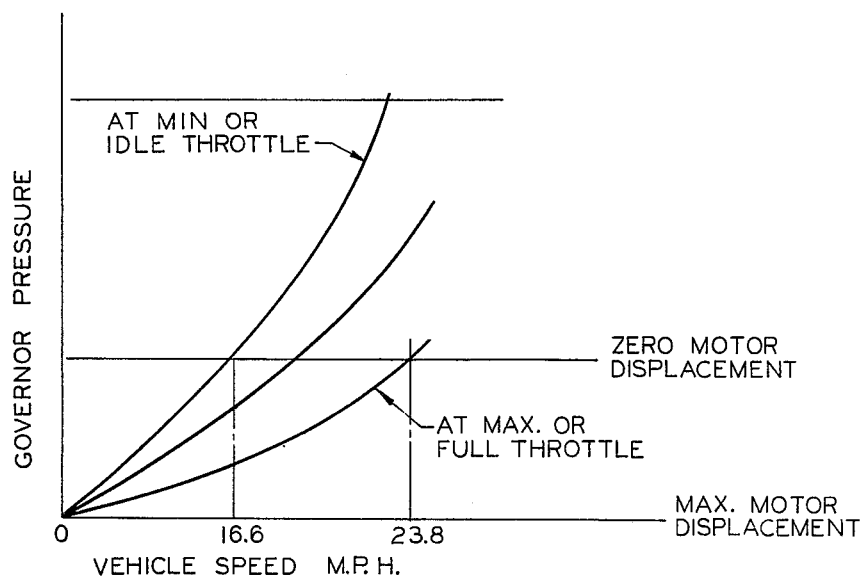
FIG. 3 is a plot showing the variation of governor pressure with both output speed and throttle position.

The weight mechanism 112 has a support bell crank lever 126 centrally pivotally mounted by pivot 127 to ear 128 fixed to sleeve 101 to mount the support bell crank lever 126 for bodily rotation about the axis of rotation of sleeve 101 and for rotation about pivot 127 transversely to the axis of rotation. The support bell crank lever 126 has one arm portion 129 extending substantially parallel to the axis of rotation of sleeve 101 beyond the sleeve, and at its end has pivot 131 to pivotally mount bell crank weight lever 132 on and for pivotal movement relative to the free end of bell crank lever arm portion 129. The bell crank weight lever 132 has one actuating arm 133 extending transversely for engaging the end of valve stem portion 122 to transmit force to valve element 106 and a weight portion 134 extending away from pivot 131 in an axial and transverse direction and supporting at its end the weight 136. During rotation of the weight mechanism the centrifugal force of the weight transversely outward from the axis of rotation is applied by weight lever 132 to stem 122 and valve element 106 in a governor pressure increasing direction. The throttle control rod 14 (FIG. 1), actuates a throttle control rod portion 137 with movement proportional to throttle movement. The throttle rod portion 137 has fixed thereto an annular internal channel member 138, both guided for only axial movement by guide means [not shown]. Channel member 138 cooperates with ball 139 on the end of control arm 141 of support bell crank lever 126. Axial movement of throttle rod portion 137 moves channel member 138 axially or parallel to the axis of rotation of sleeve 101 and, through channel member 138 and ball 139, moves support bell crank lever 126 to vary the distance A between the governor axis and pivot 131 to vary the governor force provided by weight 136 relative to speed relative to throttle position or torque demand. The governor weight pivot 131 is moved closer to the axis of the governor 54 with increasing throttle and thus the governor pressure curves are higher relative to output or vehicle speed at minimum or idle throttle and decrease with increasing throttle to a minimum relative to output or vehicle speed at maximum or full throttle position. Thus governor pressure is a governor throttle signal pressure increasing with increasing output or vehicle speed and decreasing with increasing throttle or torque demand. These governor pressure curves, at the various throttle positions, each increase with increasing output or vehicle speed, as shown by the curves of FIG. 3. The weight mechanism 112 is normally balanced by a counterweight or a duplicate weight mechanism [not shown] on the opposite side of sleeve 101.

The servo position valve 151 has a valve element 152 having lands $a$ and $b$ of equal diameter located in a bore 153 of valve body 103. The bore 153 has an end closure 154 providing a chamber 156 between it and the adjacent valve element land 152$b$. The chamber 156 is connected by a passage 157 through the land $b$ to the space between lands $a$ and $b$. The bore 153, has at the other end, an end wall 158 having a guide opening 159 receiving the displacement position actuator rod 161 for reciprocating movement. The rod is secured to piston rod 92 by a suitable arm 162 or by other linkage mechanism so that the rod 161 has the same movement or a proportional movement relative to piston rod 92, piston 87, and cam crosshead 93. The rod 161 enters bore 153 and has inside the bore a spring seat 163 secured thereto. A spring 164 positioned in the bore abuts spring seat 163 and the end of land 152$a$. The land 152$a$ has a spring guide and stop member 165 to guide and limit compression of the spring 164. The bore 153 between the land 152$a$ and end wall 158 has a spring chamber portion 166 vented by exhaust 167.

The servo position valve 151 supplies fluid regulated at a pressure proportional to the position of cam crosshead 93. The servo position pressure applied to servo position signal line 168 provides a pressure which increases from a low value, greater than zero at maximum motor displacement, to a high value at zero motor displacement, equal to or slightly less than the governor pressure at the speed at which it is desired to terminate operation of hydrostatic transmission unit 33. The servo position signal line 168 is always connected by its port 169 to bore 153 between lands 152$a$ and $b$. The mainline 59 is connected by its port 171 at the end of land 152$b$ adjacent the space between the lands $a$ and $b$. The exhaust port 172 is connected to exhaust 173 at the edge of land 152$a$ adjacent the space between the lands $a$ and $b$. Thus, when mainline pressure is supplied to port 171, it enters the space between the lands $a$ and $b$ and, through passage 157, the bias chamber 156 to oppose the bias force of spring 164 and exhausts excess fluid to exhaust port 172 to regulate the position signal pressure in line 168 in proportion to the bias force of spring 164 which is proportional to the position of actuator rod 161 and piston rod 92.

The servo control valve 176 regulates the servo control pressure applied by line 182 to chamber 89 of servo 86 in accordance with governor pressure in line 116 and servo position pressure in line 168. The servo control valve 176 has a valve element 177 having lands $a$ and $b$ of equal diameter in a bore 178 which is closed at both ends to provide, adjacent land $a$, governor pressure chamber 179 supplied by governor pressure line 116, and adjacent the end of land $b$ servo position pressure chamber 181 supplied by position signal line 168. The servo control pressure line 182 is connected to the displacement increasing chamber 89 of the servo 86 and to the port 183 in bore 178 which is in all positions of valve element 177 in the space between the lands $a$ and $b$. The mainline 59 is connected by port 184 to the edge of land 177$a$ adjacent the space between the lands $a$ and $b$, and the exhaust port 185 in the bore 178 is located at the edge of land $b$ adjacent the space between the lands $a$ and $b$. The servo control regulator valve 176 supplies mainline pressure to the servo control pressure line 182 and displacement increasing chamber 89 to increase motor displacement when servo position pressure from signal line 168 is greater than governor pressure from line 116 and exhausts servo control pressure in line 182 and displacement increasing chamber 89 to decrease motor displacement when governor pressure from line 116 is greater than servo position pressure from signal line 168. Thus the position of cam crosshead 93 is inversely proportional to governor pressure, i.e., at zero speed and governor pressure, the cam crosshead 93 is in maximum motor displacement position, and at the same predetermined high governor pressure at the vehicle speed at minimum throttle and the vehicle speed at maximum throttle, the cam crosshead 93 provides zero motor displacement to end hydrostatic unit 33 operation. Thus hydrostatic unit 33 operation is provided at minimum throttle in a reduced low speed range (i.e., 0 to 16.6 mph), and with increasing throttle, increases the speed range to maximum throttle, an increased low speed range, i.e., 0 to 23.8 mph.

The friction transmission 38 is controlled by a suitable known friction transmission or toric unit control system 186 having a manual valve and a toric ratio control system responsive to speed and torque demand as shown in U.S. Pat. No. 3,574,289 Scheiter et al, granted Apr. 13, 1971, which is incorporated herein by reference. Such controls may have a separate source of fluid pressure (pump 218 as shown in this Scheiter et al patent), or be supplied from source 56 by mainline 59, as shown in FIG. 4. The control rod 187, pivotally connected to arm 188 to rotate or tilt discs 41 to change the toric ratio, diagrammatically illustrates known linkage for this purpose, as shown in the above U.S. Pat. Nos. 3,581,587 and 3,574,289. The controls 186, as shown in FIGS. 4a and 4b of the above U.S. Pat. No. 3,574,289, have a manual valve 288 which is controlled by a manual control rod 328 movable between reverse [R], neutral [N], drive [D], and drive 1 positions, and is shown in FIG. 4 hereof as control rod 189.

The manual valve controlled by rod 189 conventionally supplies mainline pressure in forward drive positions [D] and [1] to forward clutch 191 and exhausts reverse clutch 192 for forward drive, in reverse [R] position to reverse clutch 192 and exhausts forward clutch 191 for reverse drive, and in neutral [N] position exhausts both clutches 191, 192, for neutral. In U.S. Pat. No. 3,574,289, the automatic toric ratio control system has a governor 216 driven by the engine or toric unit input, but in the FIG. 1 and 2 power trains herein, the troic governor of toric unit control 186 is driven by engine or input shaft 17 to hydromechanical unit 34. In U.S. Pat. No. 3,574,289, the torque demand pressure signal is provided by a gasifier discharge pressure valve assembly 642 which could be used in the toric unit control 186, but herein it is preferred, for a more accurate interrelation of the toric unit control and the hydrostatic unit control, that the same engine function be used for both controls. Thus with the throttle pedal position torque demand control of governor 54 and relief valve 76 used in the control for hydrostatic unit 33, a conventional throttle pedal position controlled torque demand valve which would be like valve 642 of U.S. Pat. No. 3,574,289 except that instead of gasifier pressure on diaphragm 670 and push rod 666 acting on the valve element, the throttle rod compresses a spring acting on the valve element to increase torque demand signal pressure with increasing throttle. In U.S. Pat. No. 3,574,289, the governor pressure signal in line 742–744 and the torque demand signal in line 756 act on the main toric ratio valve assembly 362 to control toric ratio in response to speed and torque demand between a toric unit speed ratio of 0.4:1 and 2:1 over the full speed range, and is calibrated for the FIG. 1 power train herein to provide 0.4:1 to 0.59:1 toric unit speed ratio increase in a low starting speed range, at full throttle with a 0 to 23.8 mph vehicle speed increase, and at minimum throttle with a 0 to 16.6 mph vehicle speed increase. At higher vehicle speeds above this low starting speed range, the hydrostatic unit 33 is not operative, but the main toric ratio control valve progressively variably increases toric speed ratio with vehicle speed to a maximum, e.g., 1.5:1 or 2:1. The toric transmission speed ratio varies in a mean range, generally about 1:1 ratio, preferably 0.4 to 1.5 or 2, avoiding extremely low speed ratios near zero and extremely high speed ratios which are not preferred in toric transmissions. Maximum speed ratio occurs at a lower vehicle speed at minimum throttle and at a higher vehicle speed at maximum throttle.

In the FIG. 2 power train, the minimum speed ratio stop of the system is changed from 0.4:1 to 0.59:1, so the main toric ratio control valve can have the same calibration but only functions above the low starting speed range, 0 to 16.6 mph at minimum throttle and 0 to 23.8 mph at maximum throttle, so the toric unit speed ratio is a constant 0.59:1 during hydrostatic transmission unit 33 variable ratio operation and functions above the low starting speed range to provide progressively variable toric unit 38 speed ratio change, as in the FIG. 1 power train.

The normally open solenoid sut-off valve 81 is grounded and controlled by a normally open switch 196. The zero displacement cam 197 on piston rod 92, connecting servo motor 86 to displacement cam crosshead 93 functions only at zero displacement position [OD], as shown, to close switch 196 to connect electric power source or grounded battery 198 by supply conductor 199 to feed conductor 201 and energize grounded solenoid valve 81 to close the shut-off valve only at zero displacement position of motor 47. In all other displacement positions of motor 47, cam 197 does not engage switch 196 so switch 196 is open, and normally open solenoid shut-off valve 81 is deenergized and open. Shut-off valve 81 and its controls improve efficiency in the nonhydrostatic range.

The normally closed neutral dump valve 83 is energized only in neutral position [N] of manual control 189. A neutral cam 202 fixed on manual control 189 only closes the normally open switch 203 in neutral position of manual control member 189 to connect supply conductor 199 to feed conductor 204 to the grounded normally closed solenoid dump valve 83 to open dump valve 83 to relieve pressure in pressure delivery line 68 to suction line 71. In all other operating positions of manual valve control 189, switch 203 is open and exhaust valve 83 is closed. Exhaust valve 83 and its controls provide a positive neutral.

OPERATION

Gas turbine engines, particularly a typical single shaft gas turbine engine 10, have a minimum speed or idle speed to maximum speed operating range in a high speed range, and provide in this operating speed range gross or engine turbine torque increasing at a high nearly constant rate in a major portion of this speed range and then increasing at a reduced rate as maximum torque is approached at maximum speed. The net engine output torque, gross torque less the torque required to accelerate the engine and any accessory torque, similarly increases. The typical single shaft gas turbine engine 10 has a high idle to maximum speed range of the turbine shaft (e.g., 33,800 to 52,000 rpm) and includes a reduction gear drive providing about a 0.4:1 speed reduction to the output shaft driving transmission input shaft 17,17' in a lower but still high operating speed range from minimum or idle speed to maximum or full throttle speed (e.g., 8,600 to 12,300 rpm), with a net torque low at idle speed and maximum near full throttle speed, e.g., 30 to 100 ft. lbs. This speed range is high and the idle torque is low as compared to compression ignition internal combustion engines.

The operating concept of the transmissions shown in FIGS. 1 and 2 is explained below, with reference first to the common features and then with reference to the different features of each specific illustrative transmission as used in a specific illustrative vehicle. The illustrative vehicle has a gross weight of 5,200 lbs., and the reduction ratio of the forward reverse gear unit 51,51' and the rear axle and the drive wheels 55,55' will provide, when a torque of 500 ft. lb. is delivered by ratio output shaft 44,44' to the forward reverse gear unit 51,51' during a maximum acceleration rate of 17.5 ft./sec², the maximum tractive effort without wheel slip.

The TABLE I below shows the common relationships for both the FIG. 1 and FIG. 2 transmissions for selected vehicle speeds in MPH (Col. 1), during a wide open throttle standing start; the engine speed RPM (Col. 2), which is the speed of the engine output and transmission input shaft 17,17' from idle speed to maximum speed; the output speed RPM (Col. 3), which is the speed of output shaft 44,44' of the variable ratio unit 35; the engine gross torque (Col. 5); the engine net torque (Col. 6), which is the engine gross torque less the torque required to accelerate the engine due to its rotational inertia and to drive and accelerate any vehicle accessory load (e.g., pump 18,18'), or the torque delivered by shaft 17,17' to the transmission; the ratio unit speed ratio (Col. 4); and ratio unit torque ratio (Col. 7). These ratio unit or overall speed and torque ratios are for the ratio change unit 35, which includes the hydromechanical unit 34 and friction transmission unit 38, for a wide open throttle acceleration from a standing start from idle to maximum engine speed and torque, and from stall to a transition vehicle speed (e.g., 0 to 23.8 mph vehicle speed), providing a constant output torque (e.g., 500 ft. lb.) to ratio or toric output shaft 44,44' at all vehicle speeds and engine net torques.

TABLE I

| COL. 1 | COL. 2 | COL. 3 | COL. 4 | COL. 5 | COL. 6 | COL. 7 |
|---|---|---|---|---|---|---|
| Vehicle Speed MPH | Engine Speed RPM Shaft 17 | Output Speed RPM Shaft 44 | Ratio Unit Speed Ratio | Engine Gross Torque | Engine Net Torque Shaft 17 | Ratio Unit Torque Ratio |
| 23.8 | 12,320 | 2,360 | 0.192 | 96.0 | 96.0 | 5.2 |
| 17.8 | 11,970 | 1,770 | 0.148 | 94.0 | 79.5 | 6.3 |
| 11.9 | 11,060 | 1,180 | 0.107 | 86.0 | 63.5 | 7.8 |
| 5.9 | 9,770 | 590 | 0.060 | 65.0 | 35.0 | 14.3 |
| 0 | 8,620 | 0 | 0 | 47.0 | 30.0 | 16.7 |

In the ratio unit 35, the overall speed ratio increases in quite uniform relation relative to vehicle speed, while the torque ratio decreases during a wide open throttle acceleration from a standing start. The speed and torque ratios do not have a reciprocal relation.

The same basic control system as shown in FIG. 4 is used to control the transmission power train shown in FIG. 1 and the FIG. 2 modified transmission, but there are differences in the degree of response to governor pressure and torque demand signals in the control of the motors 47,47' and toric units 38,38', and some differences in the function of these transmissions, as explained below.

In neutral [N] position of the manual control 189, both transmissions and the control system function in the same manner. When the manual control 189 of the toric transmission is in neutral position [N], the normally open switch 203 is closed to energize and open the normally closed solenoid exhaust or dump valve 83 to dump pressure delivery line 68 directly to suction or return line 71. Thus the hydrostatic pump is unloaded in neutral and does not provide any reaction braking for ring gear 23,23' of planetary gear unit 21,21', so no drive is transmitted from input shaft 17,17' to intermediate shaft 26,26' in neutral. In neutral, the vehicle will normally be stationary (zero speed), so the governor pressure in line 116 provided by governor 54 will be zero or minimum, so the servo control valve 176 will connect mainline 59 to supply servo control pressure line 182 and displacement increase chamber 89 to move piston 87 and cam crosshead 93 to maximum displacement position of hydrostatic motor 47,47'. With the piston 87, rod 92, and cam crosshead in maximum displacement position [MD], the normally open switch 196 is open to deenergize and open normally open shut-off valve 81. However, any pressure in pressure delivery line 68 is exhausted by the open dump valve 83, so fluid pressure is not delivered to drive motor 47,47'. The input planetary gear unit 21,21' and the hydrostatic reaction and drive transmission 33,33' are in neutral, providing no drive from input shaft 17,17' respectively to intermediate shaft 26,26' and ratio output shaft 44,44'. Thus, there is no drive through planetary gear unit 21,21', hydrostatic transmission 33,33', or toric transmission 38,38', to forward reverse gearing 51,51', and no final output drive in shaft 52,52'. The hydrostatic transmission 33,33' is in maximum displacement position [MD] to initiate a drive from a standing start.

In drive position [D] of manual control 189, the control system functions in the same manner to provide the following functions in both transmissions. When the manual control 189 is moved from neutral position [N] to drive position [D], the normally open switch 203 opens to deenergize and close normally closed solenoid dump valve 83 to close dump line 82. Since shut-off valve 81 remains open, as in neutral, hydrostatic transmission 33,33' is operative to transmit torque. At vehicle stall, zero speed, output governor 54 provides in governor pressure line 116 a minimum or zero governor pressure and servo position valve 151, with displacement actuator 85 in the maximum displacement position [MD], positions spring seat 163 so spring 164 provides a low spring bias force on servo position valve element 152, causing servo position regulator valve 151 to supply servo position pressure signal line 168 at a low minimum pressure value slightly greater than zero speed governor pressure. When the servo position pressure from line 168 is slightly greater than the governor pressure from line 116, servo control valve 176 supplies mainline pressure to displacement increasing chamber 89 to act on the full area of piston 87 against mainline pressure in displacement decreasing chamber 91 acting on the reduced area of piston 87, the full piston area less the area of rod 92, so the piston rod asembly 95 is moved to, or retained in, the maximum displacement position [MD]. Also, the manual control 189 control the toric unit controls 186 to place friction discs 41,41' in the lowest speed reduction ratio and the highest torque multiplication ratio, and the forward reverse gear unit 51,51' in forward drive for initiating forward starting drive from zero vehicle speed. Also, relief valve 76 regulates the pressure difference between pressure delivery line 68 and suction line 71 to control the reaction load torque provided by pump brake 32,32', and the drive torque provided by motor 47,47' from a minimum value insufficient for vehicle creep at minimum or idle throttle and increasing to a maximum value as engine torque demand increases with increasing throttle.

With the transmission thus conditioned for drive, the governor 54, driven by output shaft 52,52', provides a governor pressure, which increases with increasing vehicle or output speed and decreases with increasing torque demand provided by the position of fuel feed or throttle rod portion 137 (e.g., FIG. 3 curves), to governor signal line 116. The position of motor displacement actuator 85, as it moves from maximum motor displacement position [MD] to zero motor displacement position [OD], or decreases displacement position proportionally increases the bias force of spring 164 of servo position valve 151 to provide in servo position signal line 168 a position signal pressure increasing as a function of decreasing displacement actuator 85 position. The governor signal pressure and servo position pressure act on balanced servo control valve 176 which functions, when servo position pressure exceeds governor signal pressure, to supply mainline 59 pressure to displacement increase chamber 89, and when governor signal pressure exceeds servo position pressure, to exhaust displacement increase chamber 89 so that the displacement position of displacement actuator 85 varies inversely relative to governor pressure, i.e., at zero governor pressure and speed, the displacement position is maximum and, as governor pressure increases to a maximum predetermined value, motor displacement position decreases to zero. Since increasing throttle or torque demand decreases governor pressure rise with speed, the zero displacement position occurs at a low speed, e.g., 16.6 mph, at idle or minimum throttle position, and occurs at increasing speeds up to 23.8 mph, with increasing throttle up to maximum throttle position.

Also in both the FIG. 1 and FIG. 2 transmissions, the input planetary gear unit 21,21' has a speed ratio of 1/3.08 or 0.325 when the ring gear 23,23' is stationary, which is decreased to zero as the ring gear 23,23' speed increases to the free rotational speed and a torque ratio of 3.08 at all speed ratios, or a constant torque ratio, and the hydrostatic pump brake 32,32' has a small displacement (e.g., 3.01 in$^3$ per revolution), as compared to the maximum displacement per revolution of the variable displacement motor 47,47'. In the hydrostatic transmission 33,33', the pump 32,32' capacity, volume of fluid pumped per unit of time, i.e., in$^3$ per minute, is greater than the motor 47,47' capacity, so normal leakage does not affect operation. The one-way brake 46,46' in both ratio units prevents reverse rotation of toric unit 38,38' which is not necessary or desirable during normal transmission operation, and provides a "hill-hold" device. Many friction traction toric transmission unit designs cannot tolerate reverse rotation because of their delicate balance of steering forces in the ratio controls.

In the FIG. 1 arrangement, motor 47 directly drives the friction transmission unit or ratio output shaft 44, so the reaction torque provided by pump brake 32 bypasses, and thus reduces, the torque transmitted by toric friction transmission unit 38 to ratio output shaft 44. On a wide open throttle standing start acceleration, the motor displacement is reduced from maximum to zero as a predetermined function of governor 54 pressure responsive to speed and torque demand by the predetermined cam surface of cam slot 96, and the toric unit controls 186 control the torque ratio of the toric friction transmission 38,38' so that motor 47 controls the pump brake 32 to reduce ring gear 23 speed from the free rotational speed to zero speed to increase the reduction speed ratio of planetary gear unit 21 from zero to 0.325 and to maintain a constant torque multiplication ratio of 3.08 between input shaft 17 and intermediate or toric input shaft 26. The toric unit controls 186 control the toric unit 38 to increase its reduction speed ratio and reciprocally reduce its torque multiplication ratio. The increasing engine speed is reduced by the increasing speed ratios of both the planetary gear and toric units to increase the speed of toric or ratio output shaft 44. The net engine torque is multiplied by the constant torque multiplication ratio of planetary gear unit 21 and the decreasing torque multiplication ratio of the respective toric friction transmission unit 38 to provide increasing torque in a mechanical path from input shaft 17 to toric or ratio output shaft 44. The hydrostatic transmission 33, which has the motor displacement controlled to control the pump brake 32 to provide the above planetary gear unit 21 speed ratio change and to provide the proper reaction torque for the gear unit torque multiplication of increasing engine torque, also provides a power delivery hydrostatic transmission. The ring gear 23 drives pump brake 32 and delivers pressure fluid to motor 47 to apply torque through this hydrostatic systemm which decreases with increasing governor 54 pressure. The motor control system, with cam slot 96 and toric control system, have a predetermined functional relation to governor pressure and torque demand, so the sum of mechanical and hydrostatic torque is a constant value, e.g., 500 ft.lbs.

An illustrative example of a particular set of values for the FIG. 1 transmission when driven by the engine during a wide open throttle acceleration, as shown in TABLE I above, is shown in TABLE II below in which is shown: vehicle speed (Col. 1) for correlation with TABLE I (Col. 1); planetary gear unit 21 speed ratio (Col. 2); toric friction transmission unit 38 speed ratio (Col. 3); planetary gear unit 21 output speed in RPM (Col. 4), which is the speed of intermediate shaft 26; pump 32 speed in RPM (Col. 5), which also is the speed of ring gear 23; hydraulic delivery pressure in PSI (Col. 6) which is the pressure delivered in line 68 by the pump brake 32 to the motor 47 minus the charging pressure in return suction line 71; motor displacement in cubic inches (IN$^3$) per revolution as controlled by the control system (Col. 7); and torque out for 500 ft.lb. total (Cols. 8a and 8b), which is the torque to ratio output shaft 44, having a mechanical portion (MECH.) provided by the planetary gear and toric units 21 and 38, and a hydraulic portion (HYD.) provided by hydrostatic transmission 33.

TABLE II

| COL. 1 | COL. 2 | COL. 3 | COL. 4 | COL. 5 | COL. 6 | COL. 7 | COL. 8a | COL. 8b |
|---|---|---|---|---|---|---|---|---|
| Vec SPEED MPH | GEAR UNIT SPEED RATIO | TORIC UNIT SPEED RATIO | GEAR OUT SPEED RPM | PUMP SPEED RPM | HYD. PRESS. PSI | MOTOR DISP. CU.IN. | TORQUE 500 FT. LB. MECH. | OUT TOTAL 500 FT. LB. HYD. |
| 23.8 | .32 | .59 | 4000 | 0 | 5000 | 0 | 500 | 0 |
| 17.8 | .25 | .53 | 3340 | 811 | 4140 | .67 | 463 | 37 |
| 11.9 | .23 | .46 | 2560 | 1520 | 3310 | 1.73 | 424 | 76 |

TABLE II-continued

| COL. 1 | COL. 2 | COL. 3 | COL. 4 | COL. 5 | COL. 6 | COL. 7 | COL. 8a | COL. 8b |
|---|---|---|---|---|---|---|---|---|
| Vec SPEED MPH | GEAR UNIT SPEED RATIO | TORIC UNIT SPEED RATIO | GEAR OUT SPEED RPM | PUMP SPEED RPM | HYD. PRESS. PSI | MOTOR DISP. CU.IN. | TORQUE 500 FT. LB. MECH. | OUT TOTAL 500 FT. LB. HYD. |
| 5.9 | .15 | .4 | 1470 | 2510 | 1820 | 9.50 | 270 | 230 |
| 0 | 0 | .4 | 0 | 4150 | 1560 | 12.97 | 231 | 269 |

Since the planetary gear unit 21 torque ratio is constant (e.g., 3.08 or 1/.32), and the toric unit 38 torque ratio is, i.e., 1/.4 or 2.5, the reciprocal of the speed ratio at each vehicle speed, these torque ratios are not shown in the above TABLE II. Mechanical torque at each vehicle speed is net engine torque times the gear unit 21 and toric unit 38 speed torque ratios (i.e., at zero speed, 30 ft.lb. × 3.08 × 2.5 = 231 ft.lb.). In the hydrostatic system the differential fluid pressure delivered by pump 32 is equal to net engine torque times the gear unit 21 torque ratio minus one (the reaction torque) times 24π divided by pump displacement (i.e., for zero vehicle speed, 30 ft.lb. (3.08-1) 24π/3.01 in³ = 1,560 psi), and the hydraulic torque delivered by motor 47 is the differential system pressure delivered by pump 32 times motor displacement (i.e., for zero vehicle speed 1,563 psix 12.97 in³/24π = 269 ft.lb.). The motor displacement values in TABLE II for each speed that are required to provide the mechanical hydraulic torque split for constant total torque, determine the slope or shape of cam slot 96. Since cam crosshead 93 has a position corresponding to each vehicle speed during full throttle acceleration, the slope of cam slot 96 is made to provide the corresponding motor displacement.

During part throttle operation the net engine torque is lower and the governor pressure increases at a higher rate relative to vehicle speed (FIG. 3), so the motor displacement is decreased at a higher rate, and planetary gear unit 21 speed ratio is increased at a higher rate for a lower performance or acceleration drive, with engine speed and torque increasing over a longer time period to intermediate values.

In the FIG. 2 arrangement, motor 47' is directly connected through planetary gear unit carrier 24' to drive toric input or intermediate shaft 26', so both the mechanical drive of planetary gear unit 21' and the hydraulic drive of hydrostatic transmission 33' are transmitted by toric unit 38' to toric output shaft 44', and the speed is reduced by the toric speed ratio and the torque multiplied by the toric torque ratio. On a wide open throttle standing start, the motor 47' displacement is reduced as a function of governor pressure by the predetermined shape of cam slot 96 so that motor 47' controls pump brake 32' to reduce ring gear 23' speed from the free rotational speed to zero speed to increase the reduction speed ratio of planetary gear unit 21' from zero to 0.325 and to maintain a constant torque ratio (e.g., 3.08), between input shaft 17' and toric or ratio input shaft 26'.

The hydrostatic transmission 33', having pump brake 32', has a constant displacement volume capacity per revolution (e.g., 3.01 in³ per revolution), and is driven by the reaction forces on ring gear 23' to provide fluid under pressure to motor 47'. Since the displacement of motor 47' is controlled to decrease displacement as speed increases, the torque decreases with increasing speed. The motor torque is delivered to toric or ratio input shaft 26'. The sum of mechanical and hydraulic torque is constant, the same at all speeds. The toric unit controls 186 provide a constant speed ratio and torque ratio, e.g., 0.59 and 1/0.59, or 1.69, to multiply the constant sum of mechanical and hydraulic torque, e.g., 295 ft.lb., to provide a constant output torque on shaft 44', e.g., 500 ft.lb.

An illustrative example of a set of values for a transmission of the type shown in FIG. 2 is shown for wide open throttle starting operation in TABLE III below. In TABLE III; vehicle speed (Col. 1) provides correlation with TABLE I (Col. 1), and reference to basic engine input and output values which are the same as in TABLE I; planetary gear unit 21' speed ratio (Col. 2); gear out speed RPM (Col. 3); or the speed of gear output and toric input or intermediate shaft 26'; pump 32' speed RPM (Col. 4), or the speed of ring gear 23' and rotor 28' of pump brake 32'; the hydraulic differential pressure PSI (Col. 5) of pump brake 32' outlet delivered to delivery line 68' and motor 47'; motor displacement in cubic inches, IN³, (Col. 6), per revolution of variable displacement motor 47'; and torque INT. (Cols. 7a and 7b), the torque delivered by hydromechanical unit 34 to intermediate shaft 26', which has a mechanical path part (MECH.), and a hydraulic path part (HYD.), having a constant total of 295 ft.lbs.

TABLE III

| COL. 1 | COL. 2 | COL. 3 | COL. 4 | COL. 5 | COL. 6 | COL. 7a | COL. 7b |
|---|---|---|---|---|---|---|---|
| VEH SPEED MPH | GEAR UNIT SPEED RATIO | GEAR OUT SPEED RPM | PUMP SPEED RPM | HYD. PRESS PSI | MOTOR DISP. IN³ | TORQUE TOTAL = 295 FT. MECH. | INT. LBS. HYD. |
| 23.8 | .325 | 4000 | 0 | 5000 | 0 | 295 | 0 |
| 17.8 | .251 | 3000 | 1316 | 4142 | .93 | 244 | 51 |
| 11.9 | .181 | 2000 | 2357 | 3309 | 2.26 | 196 | 99 |
| 5.9 | .102 | 1000 | 4216 | 1824 | 7.81 | 107 | 189 |
| 0 | 0 | 0 | 4146 | 1563 | 9.84 | 92 | 203 |

The values, which are constant or the same at all speeds in the starting speed range (e.g., 0 to 23.8 mph), at wide open throttle, are: toric speed ratio 0.59, toric torque ratio 1.69, gear unit torque ratio 3.08, pump displacement 3.01 in³ per revolution, the sum or total of mechanical torque and hydraulic torque delivered to carrier 24' and toric input or intermediate shaft 26' (295 ft.lb.) and toric output torque, which is the toric input torque times the toric ratio is constant, 295 × 1.69 = 500. Mechanical torque at each vehicle speed is the net engine torque (TABLE I), times the constant gear unit torque ratio, i.e., at zero speed, 30 ft.lb. × 3.08 = 92. In the hydrostatic system, the same formulae as stated relative to FIG. 1 and TABLE II above are used. The cam slot 96 for the FIG. 2 transmission has a cam slope to provide in each speed position the motor displacement indicated in TABLE III. During part throttle operation, the same type of lower performance or acceleration is provided.

For reverse operation of the FIG. 1 and FIG. 2 arrangements, manual control 189, in reverse position [R], engages reverse drive of forward reverse gear unit 51,51', and the control and operation of the ratio change unit 35 are the same as explained above for forward drive of the FIG. 1 and FIG. 2 arrangements.

The above-described operation of the FIGS. 1 and 2 arrangements is pictorially or graphically demonstrated by the curves in FIGS. 5 and 6.

The single shaft gas turbine engine 10,10', having speed and torque relative to speed and throttle as described above, functions with this transmission in the small engine speed range, a narrow range at a high level, e.g., 8,600 to 12,300 (curve ENGINE RPM, FIG. 5), and provides gross engine torque (curve GROSS E.T.), which is reduced by the torque required to accelerate the engine (cross-hatched area FIG. 6), to provide net engine torque (curve NET E.T.). In the accelerating low vehicle speed range, which is from zero speed to 23.8 mph at wide open or full throttle, the engine speed increases from idle to maximum at a predetermined rate, and torque increases initially at a lower rate, and then at a higher rate. Note that the FIG. 6 engine torque scale is five times larger than the transmission torque scale.

The input planetary gear unit 21,21' provides the constant planetary gear unit torque ratio (curve GEARING - T.R., FIG. 5), in both the FIG. 1 and FIG. 2 arrangements. The toric friction drive unit 38 (FIG. 1) provides a torque ratio decreasing with increasing vehicle speed (curve TORIC UNIT-1 T.R.), and the toric unit 38' (FIG. 2) provides a constant torque ratio (curve TORIC UNIT-2 T.R.). In the normal drive phase at vehicle speeds above the low starting speed phase (e.g., above 23.8 mph), the toric unit controls 186 function to reduce toric torque ratio in the same manner in both toric units 38,38', so these curves are the same. Thus as vehicle speed increases from zero speed through the transition speed to the maximum speed, the toric unit torque ratio varies in a moderate mean range about 1 to 1 torque ratio, e.g., FIG. 1 2.5, 1.69 to 0.67, and e.g., FIG. 2 1.69, 1.69 to 0.67, and speed ratio varies in a moderate mean range about 1 to 1 speed ratio from a minimum low value, very substantially above zero, to a maximum value, e.g., FIG. 1 .4, 0.59 to 1.5, and e.g., FIG. 2 0.59, 0.59 to 1.5. The planetary gear unit torque ratio and the toric unit torque ratio of each arrangement are combined by multiplication, so their product at each vehicle speed respectively provides the combined planetary gear and toric unit torque ratio for the respective FIGS. 1 and 2 arrangements (curves GEARING & TORIC UNIT T.R., FIG. 1, FIG. 2). The hydrostatic transmissions 33 and 33' contribute torque to the drive to increase the combined planetary gear and toric unit torque ratio for torque ratio improvement to the overall torque ratio (curve OVERALL T.R.). The area of torque ratio improvement provided by the hydrostatic transmission 33 in the FIG. 1 arrangement is indicated in FIG. 5 by the cross-hatching between the combined gearing and toric unit FIG. 1 torque ratio curve (dotted) and the overall torque ratio curve and by the hydrostatic transmission 33' in the FIG. 2, by the cross-hatching between the combined gearing and toric unit FIG. 2 torque ratio curve (dot dash) and the overall torque ratio curve.

In the normal drive phase, torque ratio decreases as the reciprocal of speed ratio as the hydrostatic transmission 33 ceases to drive and all ratio change is provided by the toric unit 38. This transmission, in the FIGS. 1 and 2 arrangements, provides, in the low vehicle speed accelerating phase, constant total output torque (e.g., 500 ft.lbs.), and then in the normal higher speed drive range with only the toric unit ratio change decreasing output torque (curve OUTPUT TQ FIG. 6). In the FIG. 1 arrangement, the hydraulic torque from planetary gear unit reaction ring gear 23 is transmitted by hydrostatic transmission unit 33 to the toric output or ratio shaft 44 (curve HYD. TQ to TORIC OUTPUT, FIG. 1), is added to the mechanical torque provided by planetary gear unit 21 and multiplied by toric unit 38, and also delivered to toric output shaft 44 to provide the total output torque. In the FIG. 2 arrangement, the hydraulic torque from planetary gear unit reaction ring gear member 23' is transmitted by the hydrostatic transmission 33' to the toric input or intermediate shaft 26' (curve HYD. TQ to TORIC INPUT FIG. 2), and added to the mechanical torque delivered by planetary gear 21' to the toric input or intermediate shaft 26' to provide the total torque to the toric input (curve TOTAL TQ to TORIC INPUT), which is multiplied by the toric unit 38' torque ratio to provide output torque.

Part throttle to idle throttle operation will be similar to the wide open or full throttle operation ratio change sequence shown in FIGS. 5 and 6 and described above, but the ratio change sequence will occur at lower vehicle speeds. As pointed out above and shown in FIG. 3, the governor pressure signal in line 116 increases at a higher rate relative to vehicle speed as throttle is reduced, so the controls function to reduce motor displacement from maximum to zero displacement to lock up the hydromechanical drive and the accelerating operation phase at proportionately lower vehicle speeds, e.g., 23.8 mph at full throttle to 16.6 mph at idle throttle. The toric unit controls 186 conventionally provide the ratio change sequence in response to engine or input shaft 17 speed and the ratio change sequence occurs at lower speeds as throttle is reduced from full throttle to idle. The controls are calibrated so that the reduction of the vehicle speed at which both hydromechanical unit 34,34' and toric friction unit 38,38' ratio change sequences occur is in the same proportion to decreasing throttle. Thus, during part throttle operation the ratio change sequence for both the hydromechanical unit and toric friction unit occur at lower vehicle speeds in the same proportion, but have values essentially like the full throttle operation curves in FIGS. 5 and 6. The transistion at the end of the accelerating phase from hydromechanical drive and toric friction drive to mechanical drive and toric friction drive occurs at proportionately lower vehicle speeds as throttle is reduced, but the ratio values remain the same.

The numerical illustrative values in the above specification and TABLES are based on computer and slide rule work and thus have been rounded off to reflect the overall accuracy and illustrate the concept. It will be appreciated that other modifications of the applicant's concept can be made.

I claim:

1. In a power transmission: an input providing increasing input torque with increasing input speed; an output; planetary gear means having an input member driven by said input, a reaction member, and an output member for providing a constant torque multiplication ratio and a reduction speed ratio progressively increasing from zero to the reciprocal of the torque ratio as the reaction member speed is progressively reduced from the free rotation speed to zero speed; progressively variable ratio drive means having an input element connected for drive by said output member, an output element drive connected to said output and drive connecting said input element to said output element to progressively vary the speed ratio from a low reduction speed ratio to a high speed ratio and a torque ratio from a high torque multiplication ratio to a low torque multiplication ratio; progressively variable ratio transmission means driven by said reaction member and driving one of said elements providing progressively variable speed and torque ratio drive and speed ratio control of said planetary gear means; and control system means including speed governor means providing an output speed signal proportional to the speed of said output and ratio control means operative in response to said output speed signal in a low output speed range from zero output speed to a transistion output speed to control said progressively variable ratio drive means and to control said progressively variable ratio transmission means to provide the overall progressively variable speed ratio and torque ratio to multiply increasing input torque to provide substantially constant high total torque to said output from zero output speed to said transition output speed and decreasing total torque to said output as output speed increases above said transition output speed.

2. The invention defined in claim 1, and said ratio control means including torque signal means providing a torque signal proprotional to the torque of said input and providing substantially the same ratio change sequence of both said progressively variable ratio drive means and said progressively variable ratio transmission means at lower output speeds and lower transition output speeds in proportion to decreasing torque.

3. The invention defined in claim 1, and said speed governor means further providing an input speed signal proportional to the speed of said input and said ratio control means controlling the ratios of said progressively variable ratio transmission means in response to said output speed signal and said progressively variable ratio drive means in response to said input speed signal.

4. The invention defined in claim 1, and said progressively variable ratio transmission means being hydrostatic transmission means having hydrostatic pump means driven by said reaction member, variable displacement hydrostatic motor means driving one of said elements, power fluid passage means connecting said hydrostatic pump and motor means and hydrostatic control means to progressively control the displacement of said hydrostatic motor means from a maximum to substantially zero displacement, and said ratio control means controlling said hydrostatic control means at zero output speed for providing maximum displacement for maximum torque drive by said hydrostatic transmission means and free rotation speed of said reaction member for zero speed ratio of said planetary gear means, and as output speed increases to said transition output speed to progressively decrease displacement to substantially zero to progressively decrease drive torque to zero and zero speed of said reaction member for increasing speed ratio to the maximum of said planetary gear means and at output speeds above said transition output speed maintain said motor means at substantially zero displacement.

5. The invention defined in claim 4, and said progressively variable ratio drive means being a friction transmission and said ratio control means varying the speed ratio in a mean range from a minimum substantially above zero to a maximum between zero and maximum output speed.

6. In a power transmission: a power train including an input providing increasing input torque with increasing input speed; an output; planetary gear means having an input member driven by said input, a reaction member, and an output member for providing a constant torque multiplication ratio and a reduction speed ratio progressively increasing from zero to the reciprocal of the torque ratio as the reaction member speed is progressively reduced from the free rotation speed to zero speed; first transmission means for providing progressively variable ratio driving having an input element connected for drive by said output member; an output element drive connected to said output and drive connecting said input element to said output element to progressively vary the speed ratio from a low reduction speed ratio to a high speed ratio and a torque ratio from a high torque multiplication ratio to a low torque multiplication ratio of the drive between said input and output elements; and second transmission means for providing progressively variable ratio drive, having an input part and an output part, said input part driven by said reaction member, said output part driving one of said elements, and for providing progressively variable speed and torque ratio of the drive between said reaction member and said one of said elements and speed ratio control of said planetary gear means; and control system means including speed governor means connected to said power train for providing an output speed signal proportional to the speed of said output and to control said second transmission means in response to said output speed signal for progressively decreasing the torque ratio and the torque delivered to said one of said elements from a maximum at zero output speed to substantially zero torque ratio and torque delivered as output speed increases in a low output speed range to a transition output speed, and for maintaining said substantially zero torque ratio and torque delivered in a high output speed range from said transition output speed to a high output speed for controlling said planetary gear means to increase speed ratio from zero at zero output speed to a high speed ratio as output speed increases to said transition output speed and for continuing said high speed ratio in said high output speed range and a constant torque ratio at all output speeds and to control said first transmission means for providing high torque ratio in said low speed range and progressively decreasing torque ratio as output speed increases in said high output speed range for providing overall torque ratio progressively decreasing with increasing output speed.

7. The invention defined in claim 6, and said ratio control means including torque signal means providing a torque signal proportional to the torque of said input and providing substantially the same ratio change sequence of both said first and second transmission means at lower output speeds and lower transition output speeds in proportion to decreasing torque.

8. The invention defined in claim 6, and said speed governor means further providing an input speed signal proportional to the speed of said input and said ratio control means controlling the ratios of said first transmission means in response to said input speed signal.

9. The invention defined in claim 6, and said second transmission means being hydrostatic transmission means, said input part being positive displacement pump means, said output part being variable positive displacement motor means, and having power fluid passage means connecting said pump and motor means and displacement control means for progressively decreasing the displacement of said motor means from a maximum to substantially zero displacement and said ratio control means controlling said displacement control means for providing, in response to said output speed signal, maximum displacement of said motor means at zero output speed and decreasing displacement of said motor means to substantially zero displacement at said transition output speed and maintaining displacement of said motor means at substantially zero in said high output speed range.

10. The invention defined in claim 9, and said first transmission means being friction transmission means; said speed governor means further providing an input speed signal proportional to input speed, and said ratio control means controlling the ratios of said first transmission means in response to said input speed signal in a moderate mean range of torque and speed ratios with the minimum speed ratio substantially above zero.

11. In a transmission: an input providing increasing input torque from idle to maximum torque with increasing input speed from idle to maximum torque speed; an output; planetary gear means having an input member driven by said input, a reaction member, and an output member for providing a constant torque multiplication ratio and a reduction speed ratio progressively increasing from zero to the reciprocal of the torque ratio as the reaction member speed is progressively reduced from the free rotation speed to zero speed; first transmission means of the progressively variable ratio drive type having an input element connected for drive by said output member; an output element drive connected to said output and drive connecting said input element to said output element to progressively vary the speed ratio from a low to a high speed ratio and the torque ratio from a high to a low torque multiplication ratio of the drive between said input and output elements; second transmission means of the progressively variable ratio drive type driven by said reaction member and driving one of said elements providing progressively variable speed and torque ratio drive between said reaction member and said one of said elements; and control system means including speed governor means providing an output speed signal proportional to the speed of said output, and an input speed signal proportional to the speed of said input; and ratio control means operative to control said first and second transmission means respectively in response to said input and output speed signals to provide, in a low output speed range from zero output speed to a transition output speed, control of said second transmission means to transmit high torque progressively to zero torque and to progressively reduce the speed of said reaction member from the free rotation speed to zero speed to increase said planetary gear means speed ratio progressively from zero to a maximum at a constant torque ratio and control of said first transmission means to control the speed ratio and torque ratio to multiply input torque to provide the overall progressively variable torque ratio providing high total torque to said input from zero output speed to said transition output speed as input speed increases from idle to said maximum torque speed and to provide, at output speeds above said transition output speed, control of said second transmission means to continue to transmit zero torque and control the speed of said reaction member for maximum speed ratio in said planetary gear means and control of said first transmission means to progressively decrease the first transmission means and overall torque ratios with increasing output speed at maximum torque engine speed.

12. The invention defined in claim 11, and said first transmission means being a friction transmission and said second transmission means being a hydrostatic transmission having a positive constant displacement pump drive connected to said reaction member and a positive variable displacement motor drive connected to said one of said elements, and said ratio control means progressively varying the displacement from a maximum to zero as output speed increases from zero to said transition output speed and maintaining zero displacement at higher output speeds.

13. The invention defined in claim 11, and said ratio control means including torque signal means providing a torque signal proportional to torque of said input and providing substantially the same ratio change sequence of both said first and second transmission means at lower output speeds and lower transition output speeds in proportion to decreasing torque.

14. In a transmission; an input; an output; planetary gear means having a sun gear driven by said input, a reaction ring gear, a carrier having pinions meshing with said gears for providing a constant torque multiplication ratio and a reduction speed ratio progressively increasing from zero to the reciprocal of the torque ratio as the reaction ring gear speed is progressively reduced from the free rotation speed to zero speed; friction progressively variable ratio transmission means having an input element connected for drive by said carrier, an output element drive connected to said output and progressively variable ratio friction drive means connecting said input element to said output element to vary the speed ratio from a low reduction speed ratio to a high speed ratio and a reciprocal torque ratio from a high torque multiplication ratio to a low torque multiplication ratio; hydrostatic progressively variable ratio transmission means having hydrostatic pump brake means driven by said ring gear, hydrostatic motor means driving one of said elements, fluid passage means connecting said pump brake means and motor means, and hydrostatic control means to progressively control the displacement of said motor means from zero to maximum displacement and control system means including torque demand signal means providing a signal proportional to torque demand on an engine for increasing torque, speed governor means providing a signal proportional to output speed and friction drive and hydrostatic drive ratio control means operative in response to said torque demand signal and said governor signal in a low output speed range from zero output speed to a transition output speed to control said hydrostatic control means to, at zero output speed, provide maximum motor displacement and to reduce motor displacement as a function of increasing output speed to zero motor displacement at the transition output speed to increase the speed ratio and reduce the torque ratio and decrease hydraulic torque transmitted from a maximum at zero output speed to zero at said transition output speed and to provide a reaction for said ring gear to control said planetary gear means to provide zero speed ratio at zero output speed and progressively increasing reduction speed ratios to maximum speed ratio at said transition speed and a constant torque multiplication ratio to provide increasing mechanical torque as engine torque increases and connected to and controlling said friction transmission control means to provide the speed ratio and torque ratio relative to the decreasing hydrostatic torque to multiply the increasing mechanical torque for a constant total torque to said output from zero output speed to said transition output speed and to maintain said gear set at said high speed ratio and constant torque ratio and to increase the speed ratio and decrease the torque ratio of said friction transmission means at speeds above said transition speed.

15. In a transmission; an input; an output; planetary gear means having a sun gear driven by said input, a reaction ring gear, a carrier having pinions meshing with said gears for providing a constant torque multiplication ratio and a reduction speed ratio progressively increasing from zero to the reciprocal of the torque ratio as the reaction ring gear speed is progressively reduced from the free rotation speed to zero speed; friction progressively variable ratio transmission means having an input element connected for drive by said carrier, an output element drive connected to said output and progressively variable ratio friction drive means connecting said input element to said output element to vary the speed ratio from a low reduction speed ratio to a high speed ratio and a reciprocal torque ratio from a high torque multiplication ratio to a low torque multiplication ratio; hydrostatic progressively variable ratio transmission means having hydrostatic pump brake means driven by said ring gear, hydrostatic motor means driving one of said elements, fluid passage means having a high and a low pressure passage connecting said pump brake means and motor means, and hydrostatic control means to progressively control the displacement of said motor means from zero to maximum displacement and control system means including torque demand signal means providing a torque demand signal proportional to torque demand on an engine for increasing torque, output speed governor means providing an output speed and torque demand signal proportional to output speed and modified by said torque demand means to increase at a decreasing rate with increasing torque demand and friction and hydrostatic transmission ratio control means operative in response to said torque demand signal and said speed and torque demand signal in a low output speed range which increases with increasing torque demand from zero output speed to a transition output speed to control said hydrostatic control means to, at zero output speed, provide maximum motor displacement permitting free rotation of said ring gear for maximum torque ratio and zero speed ratio and to reduce motor displacement as a function of increasing output speed to zero motor displacement at the transition output speed to increase the speed ratio and reduce the torque ratio and decrease hydraulic torque transmitted from a maximum at zero output speed to zero at said transition output speed and to provide a reaction for said ring gear to control said planetary gear means to provide zero speed ratio at zero output speed and progressively increasing reduction speed ratios to maximum speed ratio at said transition speed and a constant torque multiplication ratio to provide increasing mechanical torque as engine torque increases and connected to and controlling said friction transmission control means to provide the speed ratio and torque ratio relative to the decreasing hydrostatic torque to multiply the increasing mechanical torque for a constant total torque to said output from zero output speed to said transition output speed and to maintain said gear set at said high speed ratio and constant torque ratio and to increase the speed ratio and decrease the torque ratio of said friction transmission means at speeds above said transition speed.

16. The invention defined in claim 15 and said hydrostatic motor means driving said input element.

17. The invention defined in claim 15 and said hydrostatic motor means driving said output element.

18. The invention defined in claim 15 and said hydrostatic motor means driving said input element and said friction drive and hydrostatic drive ratio control means providing constant speed and torque ratio drive in said friction transmission means between zero output speed and said transition output speeds.

19. The invention defined in claim 15 and said hydrostatic motor means driving said output element and said friction drive and hydrostatic drive ratio control means providing decreasing torque ratio and increasing speed ratio drive in said friction transmission means as said output speed increases from zero to said transition speed.

20. The invention defined in claim 15 and said hydrostatic progressively variable ratio transmission having relief valve means connecting said high and low fluid passages operative to maintain a pressure differential in said fluid passages proportional to the sum of said torque demand signal and said speed and torque demand signal.

21. The invention defined in claim 15 and an input governor providing an input governor signal proportional to input speed and said friction and hydrostatic transmission ratio control having friction transmission ratio control means responsive to said input speed signal and said torque demand signal to control speed and torque ratio of said friction transmission means and hydrostatic transmission ratio control responsive to said output speed and torque demand signal to control speed and torque ratio of said hydrostatic transmission means and reduce the output speed at which the ratio changes occur in the same proportion with decreasing throttle.

22. The invention defined in claim 21 and a final output, a bypass valve connecting said high and low pressure passages; a forward, reverse and neutral gear unit connecting said output to said final output providing forward and reverse drives and neutral; said friction transmission ratio control means having a manual control having forward, reverse and neutral positions and operatively connected to said forward, reverse and neutral gear unit providing in the respective positions forward and reverse drives and neutral and operative in neutral position to open said bypass valve.

23. The invention defined in claim 22 and a shut off valve in said high pressure passage connected to said hydrostatic transmission ratio control operative to close said shut off valve in response to zero displacement position of said motor means.

* * * * *

UNITED STATES PATENT AND TRADEMARK OFFICE
CERTIFICATE OF CORRECTION

PATENT NO. : 4,111,073
DATED : September 5, 1978
INVENTOR(S) : Howard E. Chana

It is certified that error appears in the above-identified patent and that said Letters Patent are hereby corrected as shown below:

Column 1, line 44, "referred" should read -- preferred --
Column 1, line 58, after "proportion" insert -- to --
Column 3, line  8, "art" should read -- part --
Column 3, line 54, before "52" insert -- shaft --
Column 4, line 57, "motor" should read -- rotor --
Column 5, line  7, before "72" insert -- port --
Column 5, line 25, "poriton" should read -- portion --
Column 5, line 61, "58" should read -- 68 --

Signed and Sealed this

Fifteenth Day of May 1979

[SEAL]

Attest:

RUTH C. MASON
Attesting Officer

DONALD W. BANNER
Commissioner of Patents and Trademarks